(12) United States Patent
de Folter et al.

(10) Patent No.: US 12,048,319 B2
(45) Date of Patent: Jul. 30, 2024

(54) DOUBLE EMULSIONS COMPRISING EGG AND PROCESS FOR PREPARING THE SAME

(71) Applicant: Conopco Inc., Englewood Cliffs, NJ (US)

(72) Inventors: Julius Wouter Johannes de Folter, Vlaardingen (NL); Petrus Wilhelmus N de Groot, Vlaardingen (NL); Sabrina Silva Paes, Wageningen (NL); Stephan Georg Schumm, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 567 days.

(21) Appl. No.: 17/293,064

(22) PCT Filed: Oct. 24, 2019

(86) PCT No.: PCT/EP2019/079007
§ 371 (c)(1),
(2) Date: May 12, 2021

(87) PCT Pub. No.: WO2020/099091
PCT Pub. Date: May 22, 2020

(65) Prior Publication Data
US 2021/0401016 A1    Dec. 30, 2021

(51) Int. Cl.
| A23L 29/10 | (2016.01) |
| A23L 27/00 | (2016.01) |
| A23L 27/60 | (2016.01) |
| A23L 29/219 | (2016.01) |

(52) U.S. Cl.
CPC .............. *A23L 29/10* (2016.08); *A23L 27/60* (2016.08); *A23L 27/80* (2016.08); *A23L 29/219* (2016.08)

(58) Field of Classification Search
CPC ............................... A23L 29/10; A23L 29/219
See application file for complete search history.

(56) References Cited

U.S. PATENT DOCUMENTS

| 3,425,843 | A | 2/1969 | Japikse |
| 4,626,444 | A | 12/1986 | Takahashi et al. |
| 5,654,029 | A | 8/1997 | Heeringa et al. |
| 2008/0255247 | A1* | 10/2008 | Sagalowicz ............. A61K 8/06 516/53 |
| 2009/0317509 | A1 | 12/2009 | Golding et al. |
| 2010/0233221 | A1 | 9/2010 | Folmer et al. |
| 2015/0298084 | A1 | 10/2015 | Schoeppe et al. |
| 2018/0055065 | A1 | 3/2018 | Schoeppe et al. |
| 2021/0401015 | A1* | 12/2021 | De Folter ................ A23D 7/04 |
| 2022/0000136 | A1* | 1/2022 | De Folter ............... A23D 7/015 |

FOREIGN PATENT DOCUMENTS

| CL | 202101236 | 10/2021 |
| CL | 2021001237 | 10/2021 |
| CL | 2021001238 | 10/2021 |
| EP | 0997075 | 5/2000 |
| EP | 2054776 | 5/2009 |
| WO | WO0105241 | 1/2001 |
| WO | 03/049548 | 6/2003 |
| WO | 03/049553 | 6/2003 |
| WO | 2009/003960 | 1/2009 |
| WO | 2011/077073 | 6/2011 |
| WO | WO2012082065 | 6/2012 |
| WO | 2017/136238 | 8/2017 |

OTHER PUBLICATIONS

Garti et al.; Stabilization of Water-in-Oil Emulsions by Submicrocrystalline α-Form Fat Particles; JAOCS Journal of the American Oil Chemists' Society; 1998; pp. 1825-1831 XP002164689; vol. 75 No. 12.
Ali Marefati et al; Fabrication of encapsulated oil powders from startch granule stabilized W/O/W Pickering emulsions by freeze-drying—ScienceDirect; Food Hydrocolloids 2015 pp. 261-271; Jan. 1, 2015; pp. 261-271.
N Garti et al; Double emulsions of water-in-oil-in-water stabilized by [alpha]-form fat microcrystals. Part 1: Selection of emulsifiers and fat microcrystalline particles; Journal of the American Oil Chemists' Society JAOCS vol. 76 No. 3 1999 ; 1999; pp. 383-389; vol. 76 No. 3.
Tavernier Iris et al; Food-grade particles for emulsion stabilization; Trends in Food Science and Technology vol. 50 2016; 2016; pp. 159-174; vol. 50.
Supratim Ghosh, Derick Rousseau; Fat crystals and water-in-oil emulsion stability; Current Opinion in Colloid & Interface Science; Jun. 9, 2011; pp. 421-431; 16, No. 5.
Silva Roberta Claro Da et al; Microscopic approach of the crystallization of tripalmitin and tristearin by microscopy; Chemistry and Physics of Lipids; Apr. 14, 2016; 1-9; 198.
Macierzanka A et al: "Effect of crystalline emulsifier composition on structural transformations of water-in-oil emulsions: Emulsification and quiescent conditions", Colloids and Surfaces A: Physiochemical and Engineering Aspects, Elsevier, Amsterdam, NL, vol. 334, No. 1-3, Feb. 20, 2009 (Feb. 20, 2009), pp. 40-52.
Agama-Acevedo et al.: Starch as an emulsions stability: the case of octenyl succinic anhydride (OSA) starch, Current Opinion in Food Science, vol. 13, Feb. 2017 (Feb. 1, 2017), pp. 78-83.
Muschiolik, G.: Multiple emulsions for food use, Current Opinion in Colloid Interface Science, 12 (2007) pp. 213-220.
Den Adel et al.: Fat crystallite thickness distribution based on SAXD peak shape analysis, Eur. J. Lipid Sci. Technol., vol. 120, 2018.

* cited by examiner

*Primary Examiner* — Anthony J Weier
(74) *Attorney, Agent, or Firm* — N.V. Nederlandsch Octrooibureau

(57) ABSTRACT

A food composition in the form of a water-in-oil-in water emulsion including water; an oil phase including vegetable oil and a water-in-oil emulsifier including fat crystals; oil-in-water emulsifier, not being egg yolk; egg yolk.

16 Claims, No Drawings

DOUBLE EMULSIONS COMPRISING EGG AND PROCESS FOR PREPARING THE SAME

The present invention relates to a food composition in the form of a water-in-oil-in-water emulsion comprising fat crystals and a process for preparing the composition.

BACKGROUND OF THE INVENTION

Emulsified food compositions are known, and typical examples are dressings or sauces such as mayonnaise and salad dressing. Such emulsions typically are oil-in-water emulsions, wherein a water-continuous phase comprises droplets of oil that are emulsified in the water phase. To ensure a stable emulsion over time, an emulsifier is added. In mayonnaise compositions, traditionally the characteristic emulsifier comprises egg yolk.

Oil-in-water emulsified food products can comprise a high percentage of oil for "full fat" mayonnaises. For these products an oil level of around 65-80 wt % is typical. There is a desire of consumers to have such compositions prepared with a lower level of oil. Lower oil emulsified food products are known. Taste and organoleptic properties are however preferably similar to those experienced with "full fat" compositions. A solution found in the art is the use of double emulsions.

A double emulsion, in this context is a water-continuous emulsion that comprises droplets of a water-in-oil emulsion. When using double emulsions, the consumer can experience an oil-in-water composition with equivalent amount of oil droplets. For a double emulsion, since the oil droplets contain water, the total oil level is less, whereas the perception is that of a composition with equivalent amount of oil droplets. Such emulsions are conveniently prepared by first preparing a primary emulsion with the use of a primary emulsifier, the water-in-oil emulsifier. The primary emulsion is emulsified in a water phase with the use of a secondary emulsifier. A primary emulsifier that is known to provide stable water-in-oil-in-water emulsions is polyglycerol polyricinoleate (PGPR), E476, an emulsifier made from glycerol and fatty acids (usually from castor bean). The secondary emulsifier normally is derived from egg, such as for example egg yolk. Egg yolk is the emulsifier traditionally associated with mayonnaise manufacturing.

PGPR, E476, is a synthetic chemical compound. PGPR is a known lipophilic emulsifier that is food grade and capable to stabilize water droplets in oil. However, its use has become an area of debate. There is a desire from consumers to have food products as much as possible free from compounds that are considered 'artificial' or 'chemical'.

WO2011/077073 relates to double emulsions, and discloses a process to prepare a double emulsion wherein crystalline mono- and triglycerides are used to stabilize the primary emulsion. A primary water-in-oil emulsion is prepared by heating the mixture of water, oil and mono- and triglycerides, followed by cooling which allows the mono- and triglycerides to solidify at the interphase of the water and the oil. Nevertheless, triglyceride crystals will be formed in the oil phase, affecting the stability of the emulsion. The formed water-in-oil emulsion is then diluted with oil to decrease the concentration of fat crystals in the oil phase to increase stability and the water-in-oil emulsion is mixed with water to form a water-in-oil-in-water emulsion.

The remaining disadvantage of this process and resulting emulsion is that it is very inefficient in terms of process steps and energy use in an industrial context, as it requires heating of the internal water phase and the oil phase including the primary emulsifiers to allow primary emulsification at high temperature, followed by cooling in a votator apparatus and a subsequent extra dilution step with oil to result in the primary emulsion. This primary emulsion is then emulsified with water to prepare a water-in-oil-in-water emulsion which is stabilized with a secondary emulsifier. Another disadvantage is the use of monoglyceride or another additional primary emulsifier which is not desired as it is a non-natural ingredient and/or requires an additional label declaration. The level of fat crystals in WO'073 is limited to facilitate the second emulsification step and to prevent instability of the secondary emulsion.

US2010/0233221 relates to double emulsions which are organoleptically similar to full fat emulsions and are stabilized by a selection of emulsifiers. The object of this document is to provide stabilized double emulsions. The disclosed compositions rely on the presence of two primary emulsifiers, mostly comprising PGPR and two secondary emulsifiers. In the context of the present invention, we consider the use of several emulsifiers, mostly including PGPR as not efficient and undesired.

Next to the complications of the above prior art documents, a further problem that remains in the art is that it was found that the use of egg yolk seriously affects the use of fat crystals as primary (i.e. water-in-oil) emulsifier. Especially in a composition as a mayonnaise-like food product, there is a desire to use egg yolk for reasons of taste and labeling purposes.

Accordingly, there is still a desire for a stable emulsified food product with a relatively low fat content while providing the experience of a higher fat product, which has good stability while not relying on multiple emulsifiers, and which does not depend on added monoglycerides, preferably is free from added monoglycerides, or on the presence of PGPR, preferably is free from PGPR, and allows the presence of egg yolk or compounds derived thereof. There is a desire for a process to produce water-in-oil-in-water emulsions that do not require PGPR and monoglycerides and which is efficient in energy use and process steps.

SUMMARY OF THE INVENTION

Surprisingly this objective was achieved, at least partly, by the composition and process according to the invention. Accordingly, in a first aspect the present invention relates to food composition in the form of a water-in-oil-in water emulsion comprising:
  Water,
  An oil phase (O) comprising:
    Vegetable oil,
    Water-in-oil emulsifier comprising fat crystals,
  Oil-in-water emulsifier, not being egg yolk,
  Egg yolk.

In a further aspect the invention relates to a process to manufacture the composition of the invention, the process comprising the steps of:
  a) Providing an oil phase (O) comprising vegetable oil and fat crystals dispersed therein,
  b) Combining the oil phase from step a) with water to form a primary water-in-oil emulsion (W1/O),
  c) Combining the primary water-in-oil emulsion from step b) with a secondary water phase (W2) comprising water and water-in-oil emulsifier, not being egg yolk, to form a water-in-oil-in-water emulsion (W1/O/W2).
  d) Combining egg yolk with the emulsion obtained in step c).

DETAILED DESCRIPTION OF THE INVENTION

Emulsified Food Product

In a first aspect, the invention relates to a composition in the form of a water-in-oil-in-water (W1/O/W2) emulsion, also referred to here as 'double emulsion'. Such compositions are known in the art and used for example to reduce the total oil level of the composition. The emulsion comprises droplets of a water-in-oil emulsion that are formed from an inner water phase (W1), an oil phase comprising vegetable oil and fat crystals. The water-in-oil emulsion is emulsified in an external water phase (W2) with the use of a secondary emulsifier. It is a long-standing problem to provide an edible W1/O/W2 emulsion that is stable over time, e.g. more than 6 months. The stability is affected by coalescence of the internal water phase, which may result in coalescence of the W1 with the W2 phase. Such a loss of internal water phase W1 will lead to loss in firmness and ultimately phase separation and creaming.

An emulsifier is known in the art. Emulsifiers that are more soluble in water (and conversely, less soluble in oil) will generally form oil-in-water emulsions, while emulsifiers that are more soluble in oil will form water-in-oil emulsions. The first type of emulsifier is called an oil-in-water emulsifier, whereas the latter group is called a water-in-oil emulsifier.

The composition of the invention is preferably a mayonnaise type emulsion or a salad dressing, preferably a mayonnaise-type dressing. Such emulsions are well-known. In the context of the invention, these definitions are not limited to regulatory definitions of particular countries e.g. mayonnaise in terms of prescribed levels of oil, water, egg yolk or mustard. It includes products such as for example light mayonnaise, vegan mayonnaise etc, i.e. with a similar appearance and organoleptic perception but deviating levels or types of ingredients. A specific texture, such as a viscosity, is often recognized by consumers as mayonnaise-like dressing.

Oil Phase

The oil phase according to the invention comprises vegetable oil and fat crystals. Oil phase refers to the total amount of oil in the composition of the invention and includes liquid vegetable oil at 20° C. and fat crystals (solid fat at 20° C.).

Preferably, the oil phase is present in an amount of between 5 and 76 wt %, more preferably of between 8 and 69 wt %, even more preferably of between 10 and 47 wt %, based on the weight of the composition.

Vegetable Oil

Accordingly, the food product of the present invention comprises vegetable oil. Preferably the oil is present in an amount of from 5 to 70 wt %, more preferably of from 5 to 65 wt %, even more preferably of from 5 to 50 wt %, most preferably of from 5 to 45 wt %, based on the weight of the composition.

Vegetable oil is preferably present in an amount of less than 70 wt %, more preferably less than 65 wt %, even more preferably less than 50 wt %, even more preferably less than 45 wt %, based on the weight of the composition. It is preferably present in an amount of more than 5 wt %, more preferably of more than 8 wt %, even more preferably more than 10 wt %, more preferably of more than 12 wt %, based on the weight of the composition. It may be preferred, that oil is present in an amount of from 5 to 70 wt %, more preferably of from 5 to 65 wt %, even more preferably from 5 to 50 wt %, more preferably of from 5 to 45 wt %, based on the weight of the composition. But also ranges combined of the previous end points may be preferred, and an amount of from 5 wt % to 65 wt %, or from 8 to 50 wt %, or from 10 to 45 wt % or from 12 to 40 wt % based on the weight of the composition may be preferred.

The oil phase that can be used in the present invention can comprise edible oils conventionally used in the preparation of food emulsions. Suitable vegetable oils for the present invention are predominately composed of triglycerides. The triglyceride mixture present in the oil will preferably not crystallise at temperatures above room temperature (20° C.) preferably they will not crystallise at temperatures above 5° C. The vegetable oil is liquid at room temperature (20° C.), more preferably, the oil is liquid at 5° C. The vegetable oil is preferably chosen from soybean oil, sunflower oil, canola oil, rapeseed oil, olive oil, cottonseed oil and mixtures thereof. The fat crystals as feature of the present invention are not calculated as part of the feature "vegetable oil". The fat crystals are part of the oil phase.

The present invention comprises an oil phase, wherein the oil phase contains emulsified water (not part of the oil phase) to form a W1/O emulsion. The total amount of water-in-oil emulsion (W1/O) droplets is preferably of from 5 to 78 wt %, more preferably of from 7 to 70 wt %, even more preferably of from 10 to 65 wt % based on the weight of the food composition of the invention. It may be preferred, that the total amount of the water-in-oil emulsion droplets is preferably of from 10 to 78 wt %, more preferably of from 15 to 70 wt %, even more preferably of from 20 to 65 wt % based on the weight of the food composition of the invention.

Fat Crystals

According to the invention, the composition comprises an oil phase comprising fat crystals. Fat crystals function as emulsifier of the W1 phase in the oil phase.

Fats (hardstock) that appeared suitable for fat crystals in the context of the present invention are triglycerides or mixtures of triglycerides that crystallize at a temperature of between 58 and 72° C., preferably of between 60 and 70° C. Preferably, the fat crystals are present in solid form in the food composition at a temperature of normal use of the food composition, preferably at a temperature of between 5 and 40° C., more preferably 10 and 35° C., most preferably at 30° C. It was found to be especially preferable if said fats crystallize in the form of platelets. This can be for example obtained from fully hydrogenated vegetable oils more preferably from fully hydrogenated rapeseed oil or high erucic rapeseed oil. The fat crystals therefore preferably comprise, more preferably consist of, fully hydrogenated vegetable oil.

Hardstock fat to produce the fat crystals according to the present invention are selected from the group consisting of hardened sunflower seed oil, soybean oil, cotton seed oil, palm oil or rapeseed oil. and mixtures thereof. Preferably, the fat crystals comprise hardened rapeseed oil. Even more preferably, the fat crystals comprise, more preferably consist of, fully hydrogenated oil, more preferably comprise, even more preferably consist of fully hydrogenated rapeseed (RP70) oil or high erucic rapeseed oil (RPh70). These fats provided optimal results in the context of the invention.

As the skilled person will appreciate, the crystals of the present invention are sufficiently small so that they can cover the water droplets of the primary W1/O emulsion. As known to a person skilled in the art, crystal size can be estimated by small angel X-ray scattering (SAXS), which allows to measure the average crystal thickness of fat crystals (Ruud den Adel, Kees van Malssen, John van Duynhoven, Oleksandr O. Mykhaylyk, and Adrian Voda, "Fat Crystallite Thickness Distribution Based on SAXD", Peak Shape Analysis, Eur. J. Lipid Sci. Technol. 2018, 120, 1800222). The average crystal thickness of crystals according to the present invention is preferably less than 100 nm more preferably less than 80 nm, more preferably less than 60 nm and even more preferably less than 40 nm (as measured in the final food product).

Apart from fat crystals, one or more other lipophilic emulsifiers may be present, although that is not necessary to provide a stable double emulsion. Preferably, the amount of monoglycerides is less than 0.2 wt %, preferably less than 0.1 wt %, based on the weight of the oil phase. Preferably, the amount of monoglycerides is less than 0.05 wt %, preferably less than 0.03 wt %, based on the weight of the composition. Preferably the composition is free from monoglycerides. The amount of other W1/O emulsifiers, i.e. other than fat crystals, is preferably less than 0.2 wt %, more preferably less than 0.1 wt % based on the weight of the composition. It could be preferred that no additional W1/O emulsifier (i.e. other than the fat crystals) is present in the composition. Specifically, the amount of PGPR is preferably less than 0.2 wt %, more preferably less than 0.1 wt % based on the weight of the composition. Most preferably the composition is free from PGPR. It is preferred that the use of artificial ingredients, possibly requiring additional E-numbering on the label, is as little as possible. Additional ingredients requiring E-number labeling are preferably absent Therefore, glycerol monooleate or amidated low methoxylpectin is also not desired and preferably absent from the composition. It could be preferred that the fat crystals comprising triglycerides are the only compound added as primary emulsifier. Hence, it can be preferred, that the composition comprises water-in-oil emulsifier, wherein the water-in oil emulsifier consists of fat crystals.

The amount of fat crystal is preferably of from 0.1 to 6 wt %, more preferably of from 0.2 to 3.5 wt %, most preferably of from 0.25 to 3 wt %, based on the weight of the composition. It may be preferred that the amount of fat crystals is from 0.5 to 15%, more preferably of from 1 to 12 wt %, more preferably of from 2 to 10 wt %, even more preferably of from 2.8 to 7 wt %, most preferably of from 3 to 6 wt % based on the weight of the oil phase. The skilled person will understand that the amount of water-in-oil emulsifier should be adjusted to the amount of water to be emulsified. The amount of water-in-oil emulsifier is preferably of from 0.1 to 6 wt %, more preferably of from 0.2 to 3.5 wt %, most preferably of from 0.25 to 3 wt %, based on the weight of the composition. It may be preferred that the amount of water-in-oil emulsifier is from 0.5 to 15%, more preferably of from 1 to 12 wt %, more preferably of from 2 to 10 wt %, even more preferably of from 2.8 to 7 wt %, most preferably of from 3 to 6 wt % based on the weight of the oil phase.

It may be preferred that the food composition might also contain flavoring and coloring materials which are oil soluble or oil based and therefore are comprised in the oil phase.

Water

The total amount of water in the food composition is preferably of from 25 to 95 wt %, more preferably of 30 from 90 wt %, more preferably of 35 from 87 wt % and most preferably of from 45 to 85 wt %, based on the weight of the composition.

It is in particular preferred, that the primary water phase W1, which is the water inside of water-in-oil emulsion droplets, is present in an amount of more than 25 wt %, preferably more than 30 wt %, preferably more than 35 wt %, even more preferably more than 38 wt %, based on the weight of the primary emulsion (water-in-oil emulsion, W1/O). The amount of the water phase W1, based on the weight of the primary emulsion (W1/O) is preferably less than 70 wt %, more preferably less than 65 wt %, even more preferably less than 60 wt %, based on the weight of the primary emulsion (W1/O). The amount of the water phase W1, based on the weight of the primary emulsion (W1/O) is preferably of from 25 to 60 wt %, more preferably of from 30 to 55 wt %, more preferably of from 35 to 50 wt %, even more preferably of from 38 to 45 wt %, based on the weight of the primary emulsion (W1/O).

The continuous water phase (W2), also called secondary water phase, is preferably present in an amount of from 20 to 95 wt %, more preferably of from 22 to 90 wt %, more preferably of from 25 to 85 wt %, more preferably of from 30 to 80 wt %, and most preferably of from 25 to 75 wt % of the weight of the total composition. It may be preferred, that the continuous water phase (W2), is preferably present in an amount of from 20 to 75 wt %, more preferably of from 22 to 70 wt %, even more preferably of from 25 to 60 wt % based on the weight of the food composition of the invention.

Oil-in-Water Emulsifier (Secondary Emulsifier)

In the present invention it was found that fat crystals provide a food-grade alternative as lipophilic water-in-oil emulsifier which is strong enough to maintain emulsion stability over time, and does not rely on the presence of another primary emulsifier. It was discovered however, that the stability of the W1/O/W2 emulsion wherein the W1 phase is stabilized by fat crystals was influenced by the type of secondary emulsifier.

Preferred secondary emulsifiers could be OSA-modified starch, whey protein, legume flour, plant protein and mixtures thereof. It is preferred that the secondary emulsifier is not from animal origin. In this respect, more preferably the secondary emulsifier comprises plant protein, even more preferably is selected from the group consisting of OSA-modified starch, legume flour, plant protein and mixtures thereof.

In the context of the invention, OSA-modified starch is most preferred, because it showed an optimal result in stability, appearance and texture, compared to other secondary emulsifiers. It was found that by using OSA-modified starch stable double-emulsions could be prepared when using fat crystals as primary emulsifier, even when the fat crystals are used at a relatively high concentration. OSA modified starch is known in the art and is a modified starch produced by the esterification of the starch with dicarboxylic acids which can impart a hydrophobic character to starch (Agama-Avcevedo et al. *Current Opinion in Food Science, Volume* 13, February 2017, Pages 78-83). The octenyl succinyl groups in the OSA starch, as described in this invention, are preferably not more than 3 wt % (on an anhydrous basis), based on the weight of the starch. Commercial OSA starches are mainly produced from corn (waxy and normal), but have also been produced from other sources such as tapioca or potato. Preferably, the emulsifying OSA starch as used in this invention is produced from corn. Such a starch is for example commercially available as N-creamer46 (Ingredion), N-creamer 2230 (Ingredion) and C-Emtex (Cargill).

It may be preferred that OSA-modified starch and one or more other secondary emulsifiers can be present, although this is not needed for reasons of stability. It could be preferred that OSA-modified starch is the only oil-in-water emulsifier. The food composition could preferably comprise an oil-in-water emulsifier, wherein the oil-in-water emulsifier consists of OSA-modified starch.

The secondary emulsifier is preferably present in a total amount of from 0.2 to 6 wt %, more preferably of from 0.5 to 5 wt %, preferably of from 0.7 to 4 wt %, most preferably of from 0.8 to 3 wt %, based on the weight of the composition. OSA-modified starch is preferably present in an amount of from 0.3 to 4 wt %, more preferably of from 0.5 to 3.5 wt %, preferably of from 0.7 to 3.0 wt %, most preferably of from 0.8 to 2.5 wt %, based on the weight of the composition.

It is preferred that the amount of phospholipids in the secondary emulsifier is less than 5 wt %, more preferably less than 3 wt %, even more preferably less than 2 wt %, even more preferably less than 1 wt %, based on the weight of the secondary emulsifier. Even more preferably the secondary emulsifier is free from phospholipid. It is preferred that the amount of phosphatidylcholine (PC) in the secondary emulsifier is less than 3 wt %, preferably less than 2 wt %, preferably less than 1 wt %, based on the weight of the secondary emulsifier. A procedure to measure phospholipids in emulsions is for example described in the AOCS Official method Ja 7c-07: Lecithin Phospholipids by HPLC-ELSD. Examples of secondary emulsifiers that are not preferred in the context of the invention, and preferably are absent, are caseinate and whey protein, and the composition is preferably free of these emulsifiers. As indicated, egg yolk is present in the composition of the invention, however this is present in addition to an oil-in-water emulsifier that is not egg yolk. Egg yolk is indeed added after formation of the W/O/W emulsion, as is clear from the process according to the invention described below.

Egg Yolk

It was found, that the presence of egg yolk in a double emulsion comprising fat crystals as water-in oil-emulsifier has a negative effect on stability of a double emulsion. This problem was solved by the process of the present invention, which enables to manufacture a stable water-in-oil-in-water emulsion wherein fat crystals are used as the water-in-oil emulsifier. Stable is considered as that no phase separation or inversion appears for at least 3 months, preferably for at least 6 months from manufacturing. Accordingly, the composition of the invention comprises egg yolk. The concentration of egg yolk is preferably of from 0.5 to 12 wt %, more preferably of from 0.7 to 8 wt %, most preferably of from 1 to 6 wt % based on the weight of the composition. The concentration of phospholipids, added as egg yolk, is preferably of from 0.05 to 1.2 wt %, more preferably from 0.07 to 1 wt %. most preferable from 0.1 to 0.6 wt %, based on the weight of the composition. Phospholipids for the purpose of the invention are measured as the sum of the amounts of phosphatidic acid (PA), phosphatidylethanolamine (PE), phosphatidylcholine (PC), phosphatidylinositol (PI). The concentration of phosphatidylcholine (PC) in the composition can be from 0.06 to 1.3 wt %, more preferably from 0.08 to 1.1 wt %, most preferable from 0.11 to 0.7 wt %, based on the weight of the composition.

Miscellaneous

The present invention preferably is a food product of the type of a mayonnaise or a salad dressing. This type of products preferably has a relatively low pH. Accordingly, the pH of the composition is preferably less than 7, more preferably less than 5. Even more preferably the pH is in the range of 2-4.5, even more preferably in the range of 2.5-4.0, most preferably in the range of 2.8-4.0. It is preferred that the pH of the composition is below 5, preferably below 4.

The composition of the invention may further comprise taste ingredients in both of the water phases (W1 and W2). Some of these taste ingredients, preferably salt, sugar and acidity regulators (e.g. organic acids, lemon juice etc) can influence the osmotic pressure of the water phases.

As is known to the skilled person, it is beneficial for the storage stability of a double emulsion if the osmolality of the W1 phase is equal or somewhat higher than in the W2 phase. Osmolality differences of, for example, about 200 mOsmol/kg were found to be preferable (G. Muschiolik, Multiple emulsions for food use, Current Opinion in Colloid & Interface Science, Volume 12, Issues 4-5, p 213-220, 2007). Therefore, it can be preferred that the osmolality of the W1 phase (the water that is part of the water-in-oil emulsion, W1/O) is equal or higher than that of the W2 phase (the continuous water phase), more preferably, the difference is, for example, more than 200 mOsmol/kg. The osmolality can be adjusted by the taste ingredients in each of the W1 and W2 phases.

The composition preferably comprises at least one or more water soluble taste ingredients selected from the group of salt, sugar, and acidity regulator and mixtures thereof, preferably the composition comprises salt, sugar, and acidity regulator.

The food composition of the invention preferably comprises one or more acidity regulators. Suitable acidity regulators according to the present invention preferably comprise, one or more acidity regulators selected from the group consisting of acetic acid, citric acid, malic acid, phosphoric acid, lactic acid and combinations thereof. More preferably, the composition comprises acetic acid, citric acid or a combination thereof. It is noted that acetic acid can be added in the form of, for instance, vinegar. Citric acid can be added in the form of, for example, lemon juice. The one or more acidity regulators are preferably present in the composition in a total concentration of from 0.05 to 3 wt %, more preferably of from 0.1 to 2 wt %, by weight of the total food composition.

The food composition of the present invention preferably comprises salt. Salt can be any edible salt, preferably sodium chloride, potassium chloride or mixtures thereof. More preferably the salt comprises sodium chloride, most preferably is sodium chloride. The salt content of the food composition of the present invention is preferably in the range of from 0.2 to 10 wt %, more preferably of from 0.3 to 5 wt %, even more preferably from 0.5 to 4 wt % and most preferably of from 0.7 to 3 wt % by weight of food composition. Most preferably, sodium chloride is present in the range of from 0.2 to 10 wt %, more preferably of from 0.3 to 5 wt %, even more preferably from 0.5 to 4 wt % and most preferably of from 0.7 to 3 wt % by weight of the total food composition.

The composition of the invention preferably comprises sugars such as one or more monosaccharides and/or disaccharides. Preferred one or more monosaccharides and/or disaccharides include fructose, glucose, and sucrose. The concentration of one or more monosaccharides and/or disaccharides in the composition preferably ranges from 0.3 to 15 wt %, more preferably, from 0.5 to 12 wt %, even more preferably from 0.7 to 10 wt %, by weight of the total food composition.

It may be preferred that the food composition of the present invention may suitably contain flavouring materials, preservatives, colouring materials and/or anti-oxidants. Preferably it comprises flavouring materials selected from mustard, herbs, spices, natural and artificial flavorings and mixtures thereof.

It may be preferred that the food composition also contains flavoring and coloring materials which are oil soluble and therefore are comprised in the oil phase.

Other Parameters

Consistency

The consistency of the composition of the invention is preferably a consistency which is recognised by the consumer as the consistency of a mayonnaise, a sauce or of a salad dressing, preferably of a mayonnaise or a salad dressing, most preferably of a mayonnaise.

These compositions are viscoelastic materials that exhibit both viscous and elastic characteristics when undergoing deformation. Viscous and elastic behaviour of materials can be measured by various instruments, of which a state of the art rheometer is a suitable instrument for the present compositions. Viscous and elastic properties by rheometer can be obtained by various methods. Oscillation measurements are suitable to characterize the compositions described in the present invention. In oscillation measurements, the elastic property is commonly characterized by the storage modulus G' and the viscous property by the loss modulus G". Both moduli are only valid in the linear deformation area, as known in the art. The AR 2000 EX rheometer (TA-Instruments) is a suitable state of the art rheometer used for the analysis of the compositions of the present invention. A 4 cm steel plate geometry with 1 mm gap is a suitable geometry. Other instrument settings are known by skilled in the art operators. Especially for a mayonnaise type product, the consistency of the compositions of the present invention is described by their storage modulus G', measured at 1 Hz and 20° C., which is preferably within the range of 100-3500 Pa, more preferably in the range of 300-2000 Pa, most preferably in the range of 400-1500 Pa.

Another way to measure consistency in dressings products is by using "Brookfield viscosity" measurements. In this method, the resistance of a specified measuring spindle under specified conditions is translated to "Brookfield viscosity".

Measurement Protocol:
The equipment used is a 'Brookfield DV2TRV'
Temperature: room (20°-25° C.)
Measuring time: 30 sec
No spindle guardleg
Container: a beaker or jar with a diameter of approximately 60 mm and a height of approximately 65 mm Typical "Brookfield Viscosities" [in mPas] for Different Products:
Mayonnaise: 10000-30000 mPas (spindle #7)
Salad Dressings: 1500 to 6000 mPas (spindle #5)
Other emulsified Dressings (e.g. frite saus): 8000 to 25000 mPas (spindle #7)

Oil Droplet Size

The oil droplet size can be measured using image analysis upon microscopic analysis, preferably by CSLM (confocal scanning light microscopy). Such droplet size is typical for industrially prepared emulsified food compositions. Homemade emulsified food compositions show a much larger droplet size. The size of the droplets can be suitably measured using an image analysis program such as e.g. Fiji. It is preferred that at least 90% of the water-in-oil emulsion droplets are below 25 µm, preferably below 22 µm, even more preferably below 20 µm, most preferably below 15 µm.

It is preferred that 90% of the water droplets within the oil droplets (W1 in O) have a diameter below 6 µm, preferably below 5 µm, even more preferably below 4 µm, most preferably below 3 µm.

In a preferred aspect, the composition relates to a composition in the form of a water-in-oil-in-water emulsion, the food composition comprising:
Water,
An oil phase comprising vegetable oil, in an amount of 5 to 70 wt %, preferably 5 to 65 wt % based on the weight of the composition, and fat crystals, in an amount of 0.1 to 6 wt % preferably 0.2 to 3.5 wt % based on the weight of the composition,
Oil-in-water emulsifier, not being egg yolk, in an amount of from 0.5 to 3.5 wt % based on the weight of the food composition,
Egg yolk in an amount of from 0.5 to 12 wt %, based on the weight of the food composition,
wherein the composition comprises acetic acid, and
wherein the pH is from 2.5 to 4.

Method

Features set out in detail above in the context of the composition equally apply for the method, unless indicated otherwise. As has been indicated above, a prior art composition which does not rely on the presence of PGPR and which is efficient to prepare in terms of energy demand and process steps is not known to the inventors. The inventors believe that, the prior art process by the process of the present invention is simplified since no additional emulsifier such as monoglycerides are needed. The process further allows creation of a W1/O/W2 double emulsion that is stable, while comprising egg yolk. Accordingly, in a further aspect, the invention relates to a method to prepare a food composition according to the invention.

The process to manufacture the composition according to the invention comprises the steps of:
a) Providing an oil phase (O) comprising vegetable oil and fat crystals dispersed therein,
b) Combining the oil phase from step a) with water to form a primary water-in-oil emulsion (W1/O),
c) Combining the primary water-in-oil emulsion from step b) with a secondary water phase (W2) comprising water and oil-in-water emulsifier, not being egg yolk, to form a water-in-oil-in-water emulsion (W1/O/W2).
d) Combining egg yolk with the emulsion obtained in step c)

As known by a skilled person, the slurries of fat crystals (i.e. the oil phase comprising vegetable oil and fat crystals) in vegetable oil from step a) can be produced by mixing hardstock fat with liquid vegetable oil at a temperature where all the hardstock fat is completely molten. This is followed by rapid cooling under shear, for example in a scraped surface heat exchanger. A suitable equipment for this purpose is for example a Votator A unit. For example, US005654029A teaches how slurries of fat crystals dispersed in vegetable oil can be produced by means of a Votator A unit in combination with a Votator C unit The oil phase preferably comprises less than 0.2 wt % of monoglycerides, preferably no monoglycerides are added to the oil. By the current process, the oil phase, comprising oil and fat crystals, is developed without being in contact with the water phase.

Hardstock fats suitable for producing the fat crystals in the oil phase, of step a) are e.g. hardened rapeseed oil, hardened sunflower seed oil, hardened soy bean oil such as BO69, hardened palm oil such as PO58, hardened cottonseed oil and mixtures thereof. Most preferred is fully hardened rapeseed oil (RP70) or fully hardened high erucic rapeseed oil. Suitable liquid oils are for example vegetable oils such as sunflower seed oil, rapeseed oil, soybean oil, olive oil and mixtures thereof.

The hardstock fat can be added in an amount of 0.5-15 wt % fat in the oil phase, preferably 1 to 12 wt %, more preferably 2 to 10 wt %, even more preferably from 2.8 to 7 wt %, most preferably of from 3 to 6 wt %, based on the weight of the oil phase.

In step b) the primary water phase (W1) is emulsified in the oil phase, from step a) to form a water-in-oil emulsion (W1/O), also called primary water-in-oil emulsion (W1/O). This can be achieved by using typical emulsification equipment known to the skilled person. For example, mixers like a colloid mill or Silverson mixer, or homogenizers etc. can be used for this purpose.

In step c) the primary water-in-oil emulsion (W1/O) is added to an outer water phase (W2), comprising water and oil-in-water emulsifier, by means of a suitable emulsification equipment to form the water-in-oil-in-water emulsion (W1/O/W2) of the present invention. Suitable emulsification devices are for example colloid mills, Silverson mixer, homogenizer etc.

The resulting external, i.e. the continuous, outer water phase (W2), is preferably of from 20 to 95 wt %, more preferably of from 22 to 90 wt %, more preferably of from 25 to 85 wt %, more preferably of from 30 to 80 wt %, even more preferably of from 25 to 75 wt % and most preferably of from 25 to 60 wt % based on the weight of the food composition. Water-in-oil emulsion (W1/O) is preferably added in an amount of from 5 to 78 wt %, more preferably of from 7 to 70 wt %, even more preferably of from 10 to 65 wt %, based on the weight of the food composition.

The secondary emulsifier is added in an amount of from 0.5 to 5 wt %, more preferably in an amount of from 0.7 to 4 wt %, based on the weight of the food composition.

In step d) egg yolk is combined with the W1/O/W2 emulsion from step c). A person skilled in the art will know how to choose an appropriate mixing equipment and shear condition to achieve a homogenous mixture without breaking the W1/O/W2 emulsion. A possible mixing equipment to combine egg yolk with the W1/O/W2 emulsion is for example a Silverson mixer, operated at medium shear settings, for example 1500-3000 rpm. For step d) equipments that allow controlled mixing and blending of shear-sensitive ingredients, such as egg yolk are preferred. Equipments that can be used for step d) are known for a person skilled in the art to blend and mixing shear sensitive ingredients such as for example, static and dynamic mixers, at suitable controlled operation conditions (e.g. PCM Dosymix inline dynamic mixer). The PCM Dosymix or similar equipments are a suitable choice for mixing heterogeneous or homogeneous, viscous, shear sensitive products, as required in step d). Other suitable equipments for this step are for example the Distromix range of FDM mixers (Fluid Division Mixing, from Maelstrom, UK). FDM low shear technology provides blending and protects shear-sensitive materials such as egg yolk and also allows effective blending and texturing without heating, which is preferred in step d).

As described in the context of the composition of the invention, taste providing ingredients can preferably be added to the water phases (W1 and/or W2), such as salt, sugar, or acidity regulator. As set out above, acidity regulator is preferably added in an amount of from 0.05 to 3 wt %, more preferably of from 0.1 to 2 wt % of the resulting food composition. The acidity regulator is preferably added as vinegar. The pH of the water phase (W1) is preferably adjusted to less than 5, more preferably of less than 4, more preferably of between 2 and 4.5, more preferably of between 2.5 and 4, most preferably between 2.8 and 4.

Salt may preferably be added, preferably sodium chloride, potassium chloride or mixtures thereof. More preferably salt comprises sodium chloride, most preferably is sodium chloride. Salt is preferably added in an amount of from 0.2 to 10 wt %, more preferably of from 0.3 to 5 wt %, even more preferably from 0.5 to 4 wt % and most preferably of from 0.7 to 3 wt % by weight of the resulting food composition. Most preferably, sodium chloride is added in the range of from 0.2 to 10 wt %, more preferably of from 0.3 to 5 wt %, even more preferably from 0.5 to 4 wt % and most preferably of from 0.7 to 3 wt % by weight of the resulting food composition.

Sugars are preferably added such as one or more monosaccharides and/or disaccharides. Preferred one or more monosaccharides and/or disaccharides include fructose, glucose, and sucrose. One or more monosaccharides and/or disaccharides are preferably added in an amount of from 0.3 to 15 wt %, more preferably, from 0.5 to 12 wt %, even more preferably from 0.7 to 10 wt %, by weight of the food composition.

Salt, sugar and acidity regulator are preferably added to the water phase W1 (e.g. in step a) or W2 (e.g. in step b) or to both water phases. Preferably they are added to both the continuous water phase W2 and the internal water phase W1.

Advantage

The present invention enables the production of a water-in-oil-in-water composition which requires the use of fat crystals as water-in-oil emulsifier, while requiring less ingredients with E-numbering. The process of the invention allows production at industrial scale of stable double emulsions comprising egg yolk, which was not possible before to the best knowledge of the inventors.

The invention will now be exemplified by the following, non-limiting examples.

EXAMPLES

Ingredient List for the Examples

Drinking Water: tap water

Vegetable oil: Sunflower oil or Soybean oil

Oil phase: vegetable oil with 6 wt % fat crystals RPh70 (Fully refined, fully hydrogenated, high erucic rapeseed oil).

Egg yolk (Bouwhuis Enthoven, the Netherlands)

Osmolytes: mix of sugar, salt and vinegar

Sugar: Sucrose

Salt: sodium Chloride

Vinegar, white distilled (12% acetic acid)

Example 1: Fat Crystals and Oil Phase Production

For the following examples an oil phase comprising RPh70 fat crystals was used. RPh70 is rapeseed oil hardened to a slip melting point of 70° C. Process to produce is described for example in U.S. Ser. No. 08/424,422. This process is known by a person skilled in the art. In the following examples an oil phase with 6% of RPh70 was used. The process to produce the oil phase consisted of melting and dissolving the hardstock into the liquid vegetable oil at a temperature where all solid fat dissolved (above 70° C.) and cooling under controlled shear condition in a votator.

Example 2: Double Emulsions Process Conditions

Examples were prepared according to the following steps, except when stated otherwise:
a) W1-O1 Preparation
  The inner water phase (W1) was prepared using a Silverson overhead mixer (water mixed with osmolytes).
  The Light oil was prepared using EscoLabor (Batch size: 9 kg). EscoLabor settings:
  Oil phase (Fat crystals and sunflower oil) was added to the vessel at 6° C.
  Temperature of the vessel was set to 10° C. Vacuum was set a 0.5 bar.
  The stirrer speed was set to 141 RPM (max) and the homogenizer speed was set to 4000 RPM.
  The inner water (W1) (at 21° C.) was added into the vessel slowly and mixed for approximately 2 min.
b) W1-O-W2
  The oil-in-water emulsifier (e.g. OSA starch) and osmolytes (including salt) were dissolved in water using a Silverson overhead mixer until dissolved and stored at 5° C.
  W1-O-W2 emulsions are prepared with a Silverson overhead mixer (6-8 min at 6500 RPM with disintegration grid).
  Acetic acid (as osmolyte) was added after the second emulsification step with a Silverson overhead mixer with disintegration grid operating at 2000 RPM for 1-2 min.
c) Egg Yolk Ingredient Addition
  Egg yolk was added after the addition of acetic acid under gentle mixing conditions using a Silverson overhead mixer with disintegration grid operating at 2000 RPM for 2 min.

Example 3: Effect of Processing Conditions for Addition of Egg in a Composition Comprising Fat Crystals as Water-in-Oil Emulsifier and OSA Modified Starch as Oil-in-Water Emulsifier

|  | Egg Yolk pre added Comp. ex. % wt of total formulation | Egg Yolk post added Invention % wt of total formulation |
|---|---|---|
| Water in W1 | 24.2 | 24.2 |
| Osmolytes in W1 | 0.8 | 0.8 |
| Fat crystals (RPh70) | 2.4 | 2.4 |
| Vegetable oil | 47.6 | 47.6 |
| Water in W2 | 20.8 | 20.8 |
| OSA starch (N-creamer 46, Ingredion) | 1.5 | 1.5 |
| Osmolytes in W2* | 0.7 | 0.7 |
| Egg Yolk | 2.0 | 2.0 |
| Total | 100.0 | 100.0 |
| G' (Pa), after 4 weeks | Phase inverted | 1500 Pa |
| Appearance | Oil continuous | Smooth W-O-W emulsion |

A stable double emulsion was obtained when egg was added after the second emulsification step and OSA starch was used as oil-in-water emulsifier in combination with fat crystals as water-in-oil emulsifier.

Example 4: Lower Oil Dressing Product Using Fat Crystals as Primary Emulsifier in Combination Egg Yolk as Secondary Emulsifier

|  | Example 4 Egg yolk as secondary emulsifier |
|---|---|
| Water in W1 | 25.2 |
| Osmolytes in W1 | 4.8 |
| Fat crystals (RPh70) | 2.7 |
| Vegetable oil | 42.3 |
| Water in W2 | 18.3 |
| Egg yolk | 3.5 |
| Osmolytes in W2 | 3.2 |
| Total |  |
| G' (Pa), after 8 weeks | n/a |
| Appearance | Unstable - oil continuous emulsion |

Example 4 was produced as described in example 2.
Fat crystals was used to prepare the primary emulsion (W1-O). In example 4 egg yolk was used as secondary emulsifier. Surprisingly, using egg yolk as secondary emulsifier did not produce a stable W1/O/W2 emulsion.

The invention claimed is:
1. A food composition in the form of a water-in-oil-in water emulsion comprising:
  Water,
  An oil phase comprising (O):
    Vegetable oil, which is liquid at 20° C.,
    Water-in-oil emulsifier comprising fat crystals, wherein the fat crystals are triglycerides or mixtures of triglycerides that crystalize at a temperature of between 58 and 72° C., wherein the fat crystals are present in an amount of from 0.5 to 15 wt %, based on the weight of the oil phase,
  wherein the oil phase is present in an amount of from 5 to 76 wt %, based on the weight of the composition,

Oil-in-water emulsifier, not being egg yolk, wherein the oil-in-water emulsifier comprises less than 5 wt % phospholipid, based on the weight of the oil-in-water emulsifier, wherein the oil-in-water emulsifier is present in an amount of from 0.2 to 6 wt %, based on the weight of the composition, Egg yolk.

2. The food composition according to claim 1, wherein the composition is free from polyglycerol polyricinoleate.

3. The food composition according to claim 1, wherein fat crystals are the only water-in-oil emulsifier.

4. The food composition according to claim 1, wherein the oil-in-water emulsifier is selected from the group consisting of octenyl succinic anhydride (OSA)-modified starch, whey protein, legume flour, plant protein and mixtures thereof.

5. The food composition according to claim 1, wherein the oil phase is present in an amount of from 8 to 69 wt %, based on the weight of the composition.

6. The food composition according to claim 1, wherein the fat crystals are present in an amount of from 1 to 12 wt % based on the weight of the oil phase.

7. The food composition according to claim 1, wherein the water content contained within the oil phase is is present in an amount of more than 25 wt % based on the weight of the primary emulsion (W1/O).

8. The food composition according to claim 1, wherein the egg yolk is present an amount of from 0.5 to 12 wt %, based on the weight of the food composition.

9. The food composition according to claim 1, wherein phospholipid from egg is present in an amount from 0.05 to 1.2 wt %, based on the weight of the food composition.

10. The food composition according to claim 1, wherein the pH is less than 4.

11. The food composition according to claim 1, wherein the oil-in-water emulsifier comprises less than 3 wt % phospholipid based on the weight of the oil-in-water emulsifier.

12. The food composition according to claim 1, wherein the composition further comprises acetic acid, sugar, salt or mixture thereof.

13. The food composition according to claim 1, wherein the food composition is an emulsified sauce.

14. A process to prepare the food composition according to claim 1, the process comprising the steps of:
  a) Providing an oil phase (O) comprising vegetable oil and fat crystals dispersed therein, wherein the fat crystals are triglycerides or mixtures of triglycerides that crystalize at a temperature of between 58 and 72° C., wherein the fat crystals are present in an amount of from 0.5 to 15 wt %, based on the weight of the oil phase,
  b) Combining the oil phase from step a) with water to form a primary water-in-oil emulsion (W1/O),
  c) Combining the primary water-in-oil emulsion from step b) with a secondary water phase (W2) comprising water and oil-in-water emulsifier, not being egg yolk, to form a water-in-oil-in-water emulsion (W1/O/W2), wherein the amount of phospholipids in the oil-in-water emulsifier is less than 5 wt %,
  wherein the oil-in-water emulsifier is present in an amount of from 0.2 to 6 wt %, based on the weight of the resulting composition,
  d) Combining egg yolk with the emulsion obtained in step c).

15. The process according to claim 14, wherein the combining in step d) is performed with a low shear blending equipment.

16. The food composition according to claim 13, wherein the emulsified sauce is of mayonnaise type.

* * * * *